United States Patent [19]

Colasuono

[11] 3,850,134

[45] Nov. 26, 1974

[54] TALLYING DEVICE

[76] Inventor: Vincent J. Colasuono, 935 Utica Ave., Brooklyn, N.Y. 11203

[22] Filed: Aug. 8, 1973

[21] Appl. No.: 386,681

[52] U.S. Cl. .......................... 116/133, 35/74, 40/70, 235/88

[51] Int. Cl. .......................... G09f 9/00

[58] Field of Search ........ 116/120, 133; 235/74, 78, 235/83, 88, 111, 113, 116, 122; 40/67, 68, 70 R, 78; 35/74

[56] References Cited

UNITED STATES PATENTS

| | | | |
|---|---|---|---|
| 1,717,718 | 6/1929 | Marshall et al. | 40/70 R |
| 2,244,514 | 6/1941 | Cwiekalo | 235/113 |
| 2,806,650 | 9/1957 | Mead | 235/88 |
| 3,553,867 | 1/1971 | Von Beehren | 40/70 R |
| 3,558,044 | 1/1971 | Hitchings | 235/114 |
| 3,635,397 | 1/1972 | Kurland | 235/88 |
| 3,714,399 | 1/1973 | Cataland | 116/133 X |

*Primary Examiner*—Louis J. Capozi
*Attorney, Agent, or Firm*—Burgess, Dinklage & Sprung

[57] ABSTRACT

A tallying device for indicating two values for visual comparison thereof, e.g., for indicating horseracing morning line odds and fluctuating odds for comparison. A small diameter disc bearing indicia for the various possibilities of one of the values on a peripheral portion thereof is rotatably mounted over a supporting sheet, and a large diameter disc bearing indicia for the various possibilities of the other of the values on a peripheral portion thereof, is rotatably mounted under the supporting sheet, coaxially with the upper disc. An aperture is disposed in the supporting sheet so that values of the lower disc can be seen individually. The values can be positioned for comparison by rotating the upper disc to place the applicable mark thereon alongside the aperture, and rotating the lower disc to place the applicable mark thereon under the aperture. Desirably, as for example, for horseracing, a plurality of disc pairs as are described above, are mounted on the supporting sheet so that there is a disc pair for each horse in the race.

13 Claims, 6 Drawing Figures

TALLYING DEVICE

This invention relates to a tallying device, suitable, for example, for indicating for comparison horseracing morning line odds and the fluctuating odds.

BACKGROUND

An integral part of the sport of horseracing is the betting on the horses. Those attending, commonly bet on each race and in the case of a winner, the bettor is paid at odds determined by a long standing procedure. There are several races a day, for example nine, and well in advance of the first race, for example, in the morning of the day of afternoon races, the odds for the various horses in each race are set by the track handicapper. Those odds are known as the "morning line." They are published in track programs, and the morning line odds for each race are displayed on the track tote board until betting on the race is opened, which occurs a preselected time before the starting time for that race. After betting has opened, each bet is tallied, and the odds may change, depending on the betting. Thus, if in the morning line a horse named Bright Star is posted at odds of 10–1, i.e., as a "longshot," and the betting is very heavy on Bright Star, the odds will change to more nearly an even bet, for example, to 4–1. The running odds, in the example here set forth the 4–1 odds, are called the "fluctuating odds." At a preselected time interval before the start of a race, the betting on that race is closed. For the race, the odds at which winners are paid are the fluctuating odds at the close of betting.

Experienced bettors, among other things in their calculations, follow comparisons between the morning line and the fluctuating odds.

In general, bettors can assembly before them at their locations in the stands all the information they desire, including, for example, the morning line, form charts, tip sheets, but not including the fluctuating odds. For the fluctuating odds, they must observe the tote board.

Also, experienced bettors are interested in the changes in the odds with respect to time. Thus, the morning line on Bright Star in the first race may be 10–1. The betting on Bright Star might then be such for a substantial time interval that the odds remain at 10–1. Then, shortly before closing time the betting may become very heavy so that the fluctuating odds drop to 4–1. The tote board merely indicates the instant fluctuating odds and reveals no information as to how the fluctuating odds have changed with time.

A principal object of the invention is to provide a device for handling by the bettor at his position in the stands, for providing him with information at that location with respect to the morning line and fluctuating odds. By careful use of the device, the bettor then has with him all of the information or more of the information which he desires. Additionally, he can manipulate the device so that he has a better indication of how the odds are changing or have changed with respect to time, by indicating the odds at one moment and mentally noting about the time of the indicating, and then, at a later time, noting the odds at the tote board. Then, by comparing the various figures available, he is informed as to the rate of change of the odds.

Further objects of the invention include the provision of a device of the character indicated of a size such that it is convenient to handle manually, preferably of a size such that the device can be placed in a pocket, e.g., a coat breast pocket. Other objects are the provision of an inexpensive device having dependable operating characteristics.

THE INVENTION

Accordingly, the invention provides a tallying device for indicating two values for visual comparison thereof. The device includes a supporting sheet, an upper disc rotatably mounted on the upper side of the supporting sheet at a fixed location, and a lower disc rotatably mounted on the lower side of the supporting sheet at a fixed location, for rotation independently of the rotation of the upper disc. The upper and lower discs are coaxial, and the lower disc is of greater diameter than the upper disc. The supporting sheet extends over at least a portion of the lower disc part disposed radially outwardly of the upper disc, and there is an aperture in the supporting sheet exposing for viewing a portion of the upper face of the lower disc disposed radially outwardly of the upper disc. Indicia are disposed about the peripheral portion of the upper disc representing one of said values, and indicia are disposed about the peripheral portion of the lower disc which is rotatable under said aperture, representing the other of said values. Thus the upper disc can be rotated to place the first value alongside the aperture in the supporting plate, and the lower disc can be rotated to place the second value under the aperture so that it is visible therethrough. The said values are thereby placed side-by-side for comparison.

One of the values can be the odds of the morning line, and the other of the values can be the odds for fluctuating odds. Suitable indicia can be placed on the device to indicate which disc bears the morning line and which disc bears the fluctuating odds.

A plurality of disc pairs as are described above can be mounted as aforesaid on the supporting sheet, desirably in a number of rows, e.g., in two vertical rows, with the discs of one row being horizontally aligned with the discs of the other row or rows. Two adjacent rows can then be closely spaced, and the apertures for juxtaposed disc pairs can form a single opening in the supporting plate. Thereby the various odds are present in a highly desirable manner, and space is conserved. Desirably, a plurality of disc pairs are provided so that there is a disc pair for each horse in a race.

In one embodiment of the invention, the upper and lower discs of a disc pair are rotatably mounted on the supporting sheet by a single pin.

In an alternative construction, an under sheet is mounted beneath the supporting sheet, spaced therefrom, with the lower disc being disposed between the supporting sheet and the under sheet. The upper disc is then rotatably mounted on the supporting sheet by a first pin, and the lower disc is mounted on the under sheet by a second pin. Thereby each disc is provided with its own pin, and insurance is provided against the rotation of one of the discs causing movement of the other of the discs.

THE DRAWINGS

Representative embodiments of the invention are indicated in the accompanying drawing, wherein FIG. 1 is a plan view of a tallying device according to the invention;

In the various figures, and within the various figures, like reference characters refer to corresponding parts.

EMBODIMENTS

Figure 1:
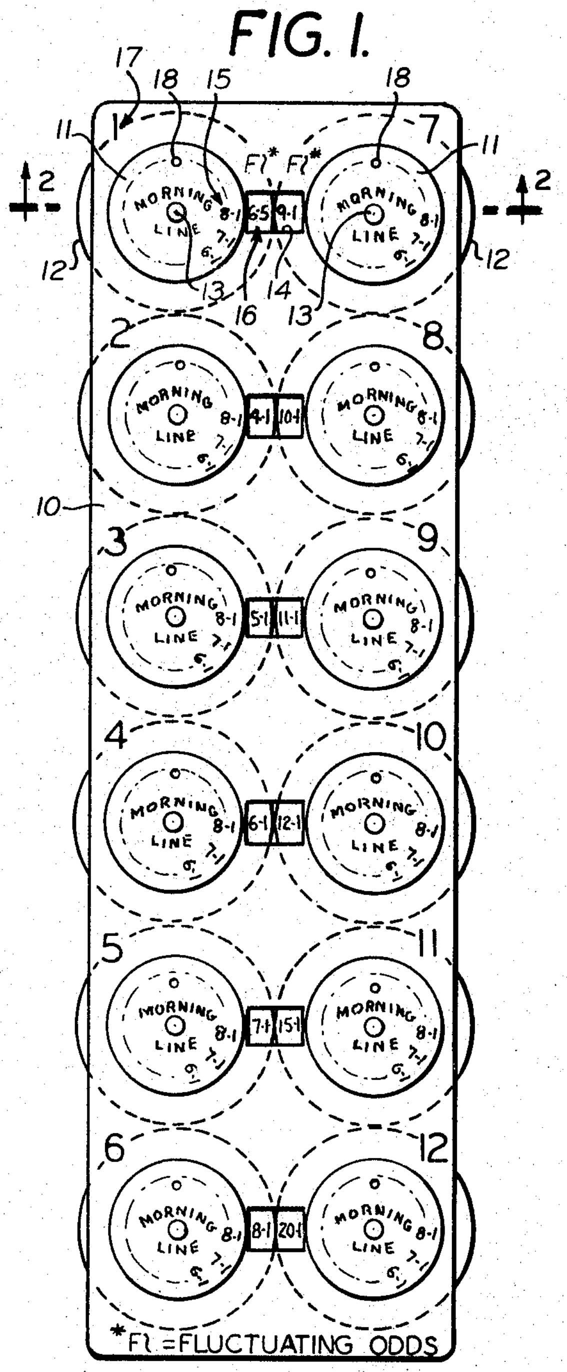

Referring to FIGS. 1, 2, 5, and 6, the tallying device comprises a supporting sheet 10. Referring to the upper left-hand corner portion of the device, an upper disc 11 is rotatably mounted on the upper side of supporting sheet 10 on pin 13. Lower disc 12 is rotatably mounted on the lower side of supporting sheet 10 also on pin 13. The mounting of the upper and lower discs on supporting sheet 10 is such that the two discs can be rotated independently of each other. The lower disc 12 is of greater diameter than the upper disc 11. An aperture 14 is provided in the supporting sheet 10, and exposes to viewing a portion of the upper face of lower disc 12 disposed radially outwardly of the upper disc. Indicia 15, morning line odds, are printed about the peripheral portion of upper disc 11. Indicia 16, indicating fluctuating odds are printed about the peripheral portion of the lower disc 12 which is rotatable under the aperture.

A hole 18 was provided in upper disc 11 for receiving the point of a pencil or pen for rotating the upper disc independently of the lower disc 12. A peripheral portion of lower disc 12 extends outwardly from beneath the supporting sheet to the left, and the lower disc 12 can be rotated with the thumb at that location. Alternatively, the supporting sheet 10 could be made somewhat wider so as to cover the lower disc 12 completely, and a scallop could be provided along the edge of the supporting sheet to permit access to the edge of lower disc 12 by the thumb.

The upper disc 11 can be rotated with a pencil point inserted in the hole 18 to place the morning line for the race opposite aperture 14. In the drawing, for the upper left-hand disc pair, the morning line is 8–1. The lower disc 12 can then be rotated to place the fluctuating odds under the aperture. In the drawing the fluctuating odds are 6–5. Thereby, the odds values are placed side-by-side for comparison.

As illustrated in FIG. 1, the device includes a plurality of upper and lower disc pairs, disposed in two vertical rows. The discs of one row are horizontally aligned with the discs of the other row, and the two rows are closely spaced. The aperture for juxtaposed disc pairs form a single opening in the supporting plate 10.

Commonly there are as many as twelve horses in a race and, as illustrated, the number of disc pairs can be twelve arranged in two vertical rows of six each. The disc pairs as illustrated, are successively numbered from one to twelve by indicia 17 on the supporting sheet. The number of disc pairs can of course be different from 12, e.g., in order of preference, 2–24, 4–18, 8–16, 10–16, 10–14. Desirably the number is an even number, thus any one of the even numbers from 2–24. Using an even number conserves space. The number can be odd, thus any of the odd numbers between 2–24. The number is preferably more than 5, better more than 9, still better more than 11. Thus the number of disc pairs can be 2, 3, 4, 5, 6, 7, 8, 9, 10, 11, 12, 13, 14, 15, 16, 17, 18, 19, 20, 21, 22, 23, or 24 or more. In order that the device have widespread usefullness for horserace betting, it should have more than 7, preferably more than 9, still more preferably, more than 11 disc pairs. Best are 8, 9, 10, 11, 12, 13 and 14, of those 12, 13, and 14 are preferred, and 12 is especially advantageous. The number of disc pairs used for a race is the number of horses in the race. The number of horses in a race is usually 5–10. More than 12 is not common but there are at times as many as 18 or 24.

As a general matter, for horse racing, there should be 12 disc pairs since if there are more than 12 horses in a race, a number of the horses equal to the number in excess of 11 are grouped and the group is made one entry for betting purposes.

The tallying device can also be used for dog racing or any other event in which a tote board is used. In dog racing, in general, there are up to 8 dogs in a race.

Figure 2:
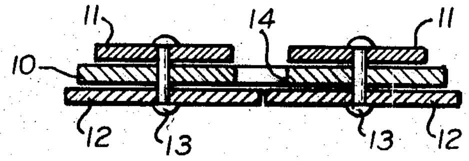
FIG. 2 is a section taken along line 2—2 in FIG. 1.

In the embodiment of FIG. 1 and FIG. 2, the disc of each disc pair are rotatably mounted on the supporting sheet 10 by a single pin or rivet 13. An alternative construction is illustrated in FIG. 3 and FIG. 4.

Figure 3:
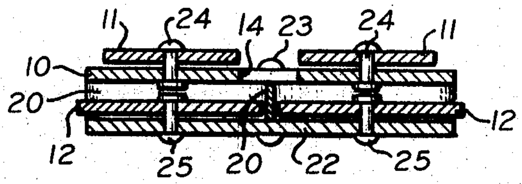
FIG. 3 is a view corresponding to FIG. 2, for an alternative construction to that indicated in FIG. 2.
Figure 4:
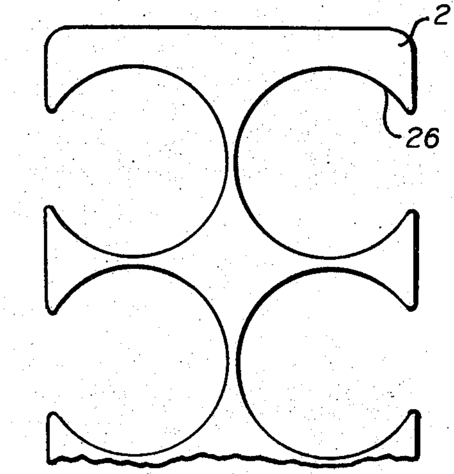
FIG. 4 is a plan view showing a portion of a spacer utilized in the construction of FIG. 3.
Figure 5:
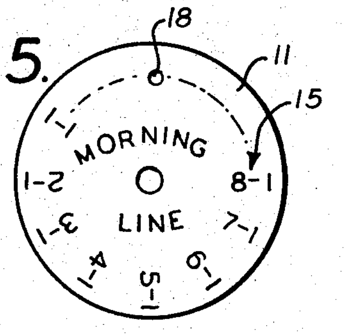
FIG. 5 and FIG. 6 are plan views of portions of the upper disc and the lower disc of a disc pair such as the disc pairs shown in FIG. 1.
Figure 6:
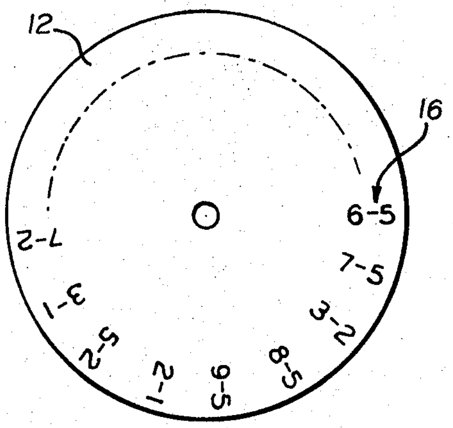

Referring to FIG. 3 and FIG. 4, an under sheet 27 is mounted beneath the supporting sheet 10, spaced therefrom. The lower discs 12 are disposed between the supporting sheet 10 and the under sheet 22. The upper disc 11 is mounted on supporting sheet 10 by a first pin or rivet 24, and the lower disc 12 is rotatably mounted on the under sheet 22 by a second pin or rivet 25. A spacer 20 is mounted between supporting sheet 10 and under sheet 22, and the supporting sheet 10 and under sheet 22 and spacer 20 are secured together by rivets 23.

The spacer 20 can be molded piece having recesses 26 for the lower discs 12. The spacer 20 can be molded together with either the supporting sheet 10 or the under sheet 22 as a single piece.

As mentioned previously the device can be of a size such that it can be conveniently carried in a pocket. For example, the device can be 2–4 preferably 2½–3 inches in width, and 5–9 preferably 6–8 inches in length. The device can be constructed of cardboard, and is preferably constructed of plastic.

The indicia for the morning line can be 1–1, 2–1, 3–1 etc. to 30–1. The fluctuating odds can be 1–1, 6–5, 7–5, 3–2, 8–5, 9–5, 2–1, 5–2, 3–1, 7–2, 4–1, 9–2, 5–1, 6–1, 8–1, 10–1, 12–1, 15–1, 20–1, 25–1.

What is claimed is:

1. A tallying device for indicating two values for visual comparison thereof comprising:

a. a supporting sheet, b. an upper disc rotatably mounted on the upper side of the support sheet at a fixed location, c. a lower disc rotatably mounted on the lower side of the support sheet at a fixed location, for rotation independently of the rotation of the upper disc, the lower disc being coaxial with respect to the upper disc and being of greater diameter than the upper disc, the lower disc forming with the upper disc, a disc pair, d. the supporting sheet extending over at least a portion of the lower disc part disposed radially outwardly of the upper disc, e. an aperture in the supporting sheet exposing to viewing a portion of the upper face of the lower disc disposed radially outwardly of the upper disc, f. indicia about the peripheral portion of the upper disc representing one of said values, g. indicia about the peripheral portion of the lower disc rotatably under said aperture, representing the other of said values, whereby the upper disc can be rotated to place said first value alongside said aperture in the supporting sheet, and the lower disc can be rotated to place said second value under said aperture so that it is visible therethrough, the said values thereby being placed side-by-side for comparison.

2. Device according to claim 1, wherein there are a plurality of said upper and lower disc pairs mounted as aforesaid on the supporting sheet, and apertures in the supporting sheet so that the lower disc of each disc pair is visible as aforesaid.

3. Device according to claim 2, wherein there are 2–24 disc pairs.

4. Device according to claim 2, wherein there are 8–16 disc pairs.

5. Device according to claim 2, wherein there are 12 disc pairs.

6. Device according to claim 1, wherein there are a plurality of said upper and lower disc pairs mounted as aforesaid on the supporting sheet in two vertical rows, the discs of one row being horizontally aligned with the discs of the other row, said rows being closely spaced, the apertures for juxtaposed disc pairs forming a single opening in the supporting plate.

7. Device according to claim 6, the number of disc pairs consisting of 12, arranged in two vertical rows of six each, the disc pairs being successively numbered from one to twelve by indicia of the supporting sheet.

8. Device according to claim 1, wherein there is a small aperture in the upper disc, for receiving a pencil or pen point for manually rotating the upper disc.

9. Device according to claim 1, said values being horseracing odds, indicia on the device indicating that one of the values is the morning line and that the other of the values is the fluctuating odds.

10. Device according to claim 1, wherein said discs are rotatably mounted on the supporting sheet by a single pin.

11. Device according to claim 1, and an under sheet mounted beneath the supporting sheet, and spaced therefrom, the lower disc being disposed between the supporting sheet and the under sheet, the upper disc being rotatably mounted on the supporting sheet by a first pin, and the lower disc being rotatably mounted on the under sheet by a second pin.

12. Device according to claim 11, and a spacer having a recess thereon for the lower disc, mounted between the supporting sheet and the under sheet.

13. A tallying device for indicating a plurality of sets of two values for visual comparison of the values of each set comprising:

a. a supporting sheet, b. a plurality of disc pairs mounted on the supporting sheet, each disc pair being as follows:

1. an upper disc rotatably mounted on the upper side of the support sheet at a fixed location,
2. a lower disc rotatably mounted on the lower side of the support sheet at a fixed location, for rotation independently of the rotation of the upper disc, the lower disc being coaxial with respect to the upper disc and being of greater diameter than the upper disc, the lower disc forming with the upper disc, a disc pair,
3. the supporting sheet extending over at least a portion of the lower disc part disposed radially outwardly of the upper disc,
4. indicia about the peripheral portion of the upper disc representing one of said values,
5. indicia about the peripheral portion of the lower disc representing the other of said values, c. apertures in the supporting sheet exposing to viewing, for each disc pair, a portion of the upper face of the lower disc disposed radially outwardly of the upper disc, said portion bearing the indicia of the lower disc, whereby for each disc pair the upper disc can be rotated to place said first value alongside an aperture in the supporting sheet, and the lower disc can be rotated to place said second value under said aperture so that it is visible therethrough, the said values thereby being placed side-by-side for comparison.

* * * * *